United States Patent
Diamant

(10) Patent No.: US 7,082,530 B1
(45) Date of Patent: Jul. 25, 2006

(54) METHOD AND APPARATUS FOR ACCELERATING HARDWARE ENCRYPTION WITH MULTIPLE NETWORKING INTERFACES

(75) Inventor: Nimrod Diamant, Kfar-Saba (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,612

(22) Filed: Dec. 31, 1999

(51) Int. Cl.
*H04L 9/00* (2006.01)
*G06F 15/16* (2006.01)
*G06F 11/00* (2006.01)
*G06F 17/00* (2006.01)

(52) U.S. Cl. ............ 713/153; 713/189; 718/105; 709/250; 714/43; 726/14

(58) Field of Classification Search ........ 713/153, 713/168, 201, 150, 154, 200; 714/1–4, 48, 714/25, 40, 43, 100; 709/105, 250, 213, 709/217, 235, 223, 226; 710/5, 302, 15; 370/245, 216, 395.63, 402; 700/7, 121; 703/21, 703/22; 718/100, 102, 104, 105
See application file for complete search history.

(56) References Cited

U.S. PATENT DOCUMENTS

| | | | | |
|---|---|---|---|---|
| 5,937,169 | A * | 8/1999 | Connery et al. | 709/250 |
| 5,978,912 | A * | 11/1999 | Rakavy et al. | 713/2 |
| 6,052,733 | A * | 4/2000 | Mahalingam et al. | 709/235 |
| 6,105,151 | A * | 8/2000 | Mahalingam et al. | 714/48 |
| 6,134,678 | A * | 10/2000 | Mahalingam et al. | 714/48 |
| 6,141,705 | A * | 10/2000 | Anand et al. | 710/15 |
| 6,192,388 | B1 * | 2/2001 | Cajolet | 718/100 |
| 6,208,616 | B1 * | 3/2001 | Mahalingam et al. | 370/216 |
| 6,209,101 | B1 | 3/2001 | Mitchem et al. | |
| 6,253,334 | B1 * | 6/2001 | Amdahl et al. | 714/4 |
| 6,314,525 | B1 * | 11/2001 | Mahalingham et al. | 714/4 |
| 6,327,614 | B1 * | 12/2001 | Asano et al. | 709/213 |
| 6,392,990 | B1 * | 5/2002 | Tosey et al. | 370/218 |
| 6,490,632 | B1 * | 12/2002 | Vepa et al. | 709/250 |
| 6,512,774 | B1 * | 1/2003 | Vepa et al. | 370/401 |
| 6,560,630 | B1 * | 5/2003 | Vepa et al. | 718/105 |
| 6,590,861 | B1 * | 7/2003 | Vepa et al. | 370/216 |
| 6,697,334 | B1 | 2/2004 | Klincewicz et al. | |
| 6,708,218 | B1 | 3/2004 | Ellington, Jr. et al. | |
| 6,765,931 | B1 | 7/2004 | Rabenko et al. | |
| 2002/0062333 | A1 | 5/2002 | Anand et al. | |
| 2003/0005231 | A1 | 1/2003 | Cihula | |

* cited by examiner

*Primary Examiner*—Christopher Revak
(74) *Attorney, Agent, or Firm*—Blakely, Sokoloff, Taylor & Zafman LLP

(57) ABSTRACT

The invention provides for utilizing abilities of network interfaces, such as embedded encryption support, or access to such encryption support, so as to extend support for such abilities to network interfaces or other devices lacking such ability. In one configuration, a non-homogeneous team of network interfaces is presented to a protocol stack as being a homogeneous team, by having network interfaces lacking a particular ability be backed up by team member supporting the ability. Various methods may be applied to distribute the work load of backing up network interface according to an operation mode of the team. For example, when operating in load balancing mode, performing backup services is balanced across the team, whereas in a fault tolerant mode, processing may be first given to non-primary network interfaces.

25 Claims, 7 Drawing Sheets

METHOD AND APPARATUS FOR ACCELERATING HARDWARE ENCRYPTION WITH MULTIPLE NETWORKING INTERFACES

FIELD OF THE INVENTION

The invention generally relates to secondary use of encryption devices, and more particularly to utilizing encryption hardware in network interface cards to provide encryption support for network interfaces lacking encryption support, and to provide parallel execution of encryption tasks by spreading such tasks across multiple network interface card encryption processors.

BACKGROUND

In conventional environments, encryption and decryption is usually performed by software. Due to the complexity involved with performing encryption, the host processor can be greatly burdened with this encryption task. This task burden is commensurate with the degree of security provided by the encryption. Unfortunately, availability of very fast computing hardware has allowed criminals to realistically apply brute-force decryption techniques to private data. Previously, typical encryption methods, such as the Data Encryption Standard (DES), used encryption key lengths of around 40–60 bits, and were considered secure.

But, as several well-publicized contests by RSA Data Security Inc. have shown, such key lengths can be compromised in a matter of days or hours. Thus, to compensate, longer key lengths (e.g., 1024 bits or higher) and more complex encryption schemes are required. This then increases the burden on the host processing system.

Such security concerns have driven efforts to provide secure networking protocols, such as Internet Protocol (IP) security, or IPSEC, promulgated by the Internet Engineering Task Force (IETF) (see IPSEC proposals at Internet location http://www.ietf.org/ids.by.wg/ipsec.html.) This modified IP protocol refers to encrypting IP data traffic with large key lengths and complex encryption algorithms. But, as noted above, such keys and algorithms burdens a host processor already responsible for general networking overhead, and overhead from executing other host processes.

SUMMARY

The invention provides utilization of multiple network interfaces for primary and secondary use processing of network traffic. A driver is loaded for a team of network interfaces, and the team is configured to operate in adapter fault tolerance mode having a primary network interface and at least one secondary network interface. Data is received for processing and transmission by the team. If the data is for primary use processing, then the data is processed and transmitted by the primary network interface. If the data is for secondary use processing, then processing of the data is distributed across the secondary network interfaces.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

DETAILED DESCRIPTION

In the following detailed description, numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

The increasing burden of performing secured encryption with long keys and complex algorithms provides an opportunity for developers to provide a way to offload encryption burdens from a host's processor. In one embodiment, network interface developers couple an encryption processor with their network interfaces that can be used to encrypt/decrypt network traffic, as well as to provide encryption services to external hardware and processes. In one embodiment, a driver for network interfaces provides access to the encryption hardware, so as to allow external hardware and processes to avoid replying on software encryption methods. Note that the encryption processor may be physically packaged with a network interface, e.g., by way of an encryption application specific integrated circuit (ASIC) (or equivalent) on a network interface, or packaged separately and communicatively thereto.

Figure 1:
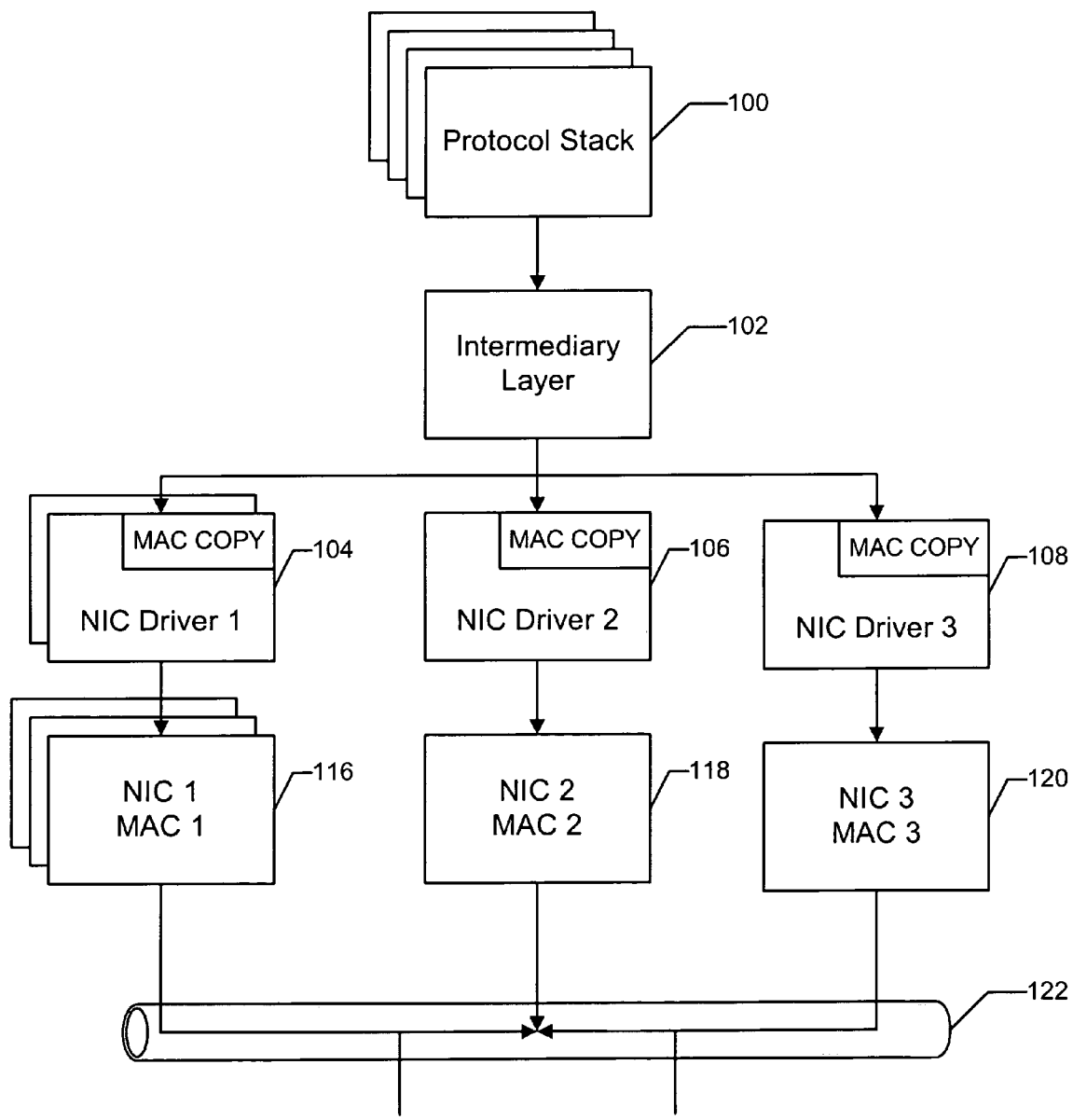
FIG. 1 illustrates a typical network communication configuration.

FIG. 1 illustrates a typical network communication configuration, in which a protocol stack 100 is in communication with an intermediary layer 102 (e.g., LSL or NDIS). There may, as illustrated, be several protocol stacks 100. It is assumed there is only a single protocol stack and a single intermediary layer. The protocol stack corresponds to typical networking protocols such as TCP, IP, SPX, IPX, NetBios, Netbeui, AppleTalk, X.400, and the like. The intermediary layer 102 is bound to the protocol stack, and helps route network traffic.

The intermediary layer is in communication with multiple network interface card base drivers 104–108. As shown, instances of a single base driver 104 can be managing multiple network interfaces (three such interfaces are illustrated as a stack of interfaces 116). For presentation clarity, it is assumed each base driver communicates with a single network interface. Note that although network interface cards, or "NICs", are shown, the term NIC is meant to include other input/output interfaces for alternate network configurations, such networks effected over serial/parallel port connections, Universal Serial Bus (USB) links, IEEE 1394 FireWire link, and the like.

In the illustrated configuration, the intermediary 102 appears to the stack 100 as a multiplexer to the different base drivers. The stack and base drivers are bound to the intermediary, resulting in network data received by the protocol stack being routed to the intermediary. The intermediary becomes responsible for forwarding the network data on to an appropriate base driver 104–108 which is then responsible for transfer of the data to the NIC hardware 116–120 for delivery over a network connection 122.

On data reception over the network 122, all NICs see the data, but only the NIC hardware with the appropriate matching MAC filter responds to the incoming data. If a NIC accepts network data, it is forwarded to its driver, which in turn forwards it to the intermediary layer which multiplexes the data to an appropriate protocol stack.

The intermediary layer is capable of accepting many upper-layer protocol stacks, in addition to multiple drivers below it. Although not provided by present networking environments, this ability of the intermediary layer provides an opportunity for allowing transparent fail-over, load-balancing, and support for new network protocols and features, without changing existing base drivers 104–108 for current network interfaces 116–120.

Figure 2:
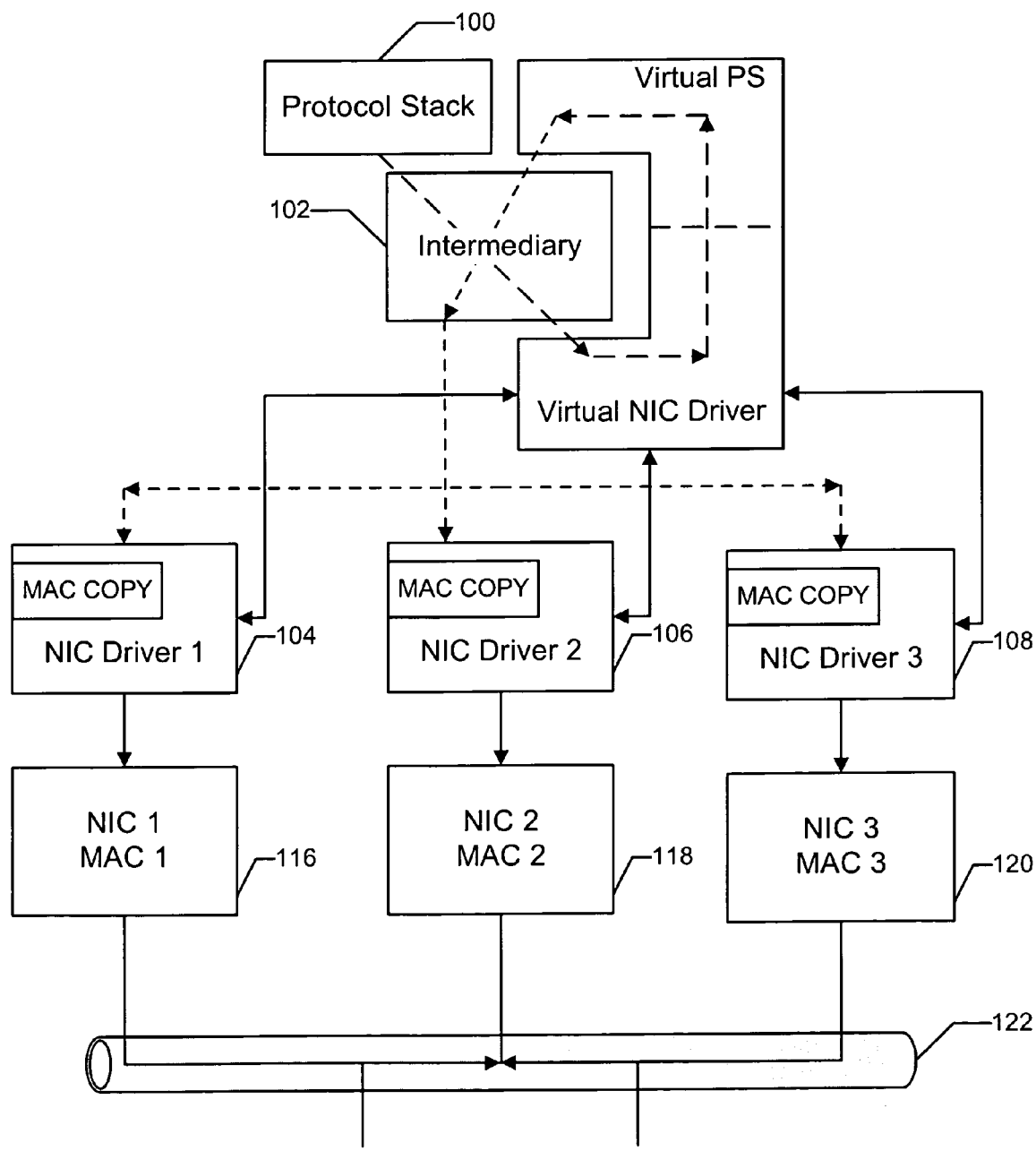
FIG. 2 illustrates a low-level view of one embodiment for providing additional networking features not ordinarily supported by a network interface.
Figure 3:
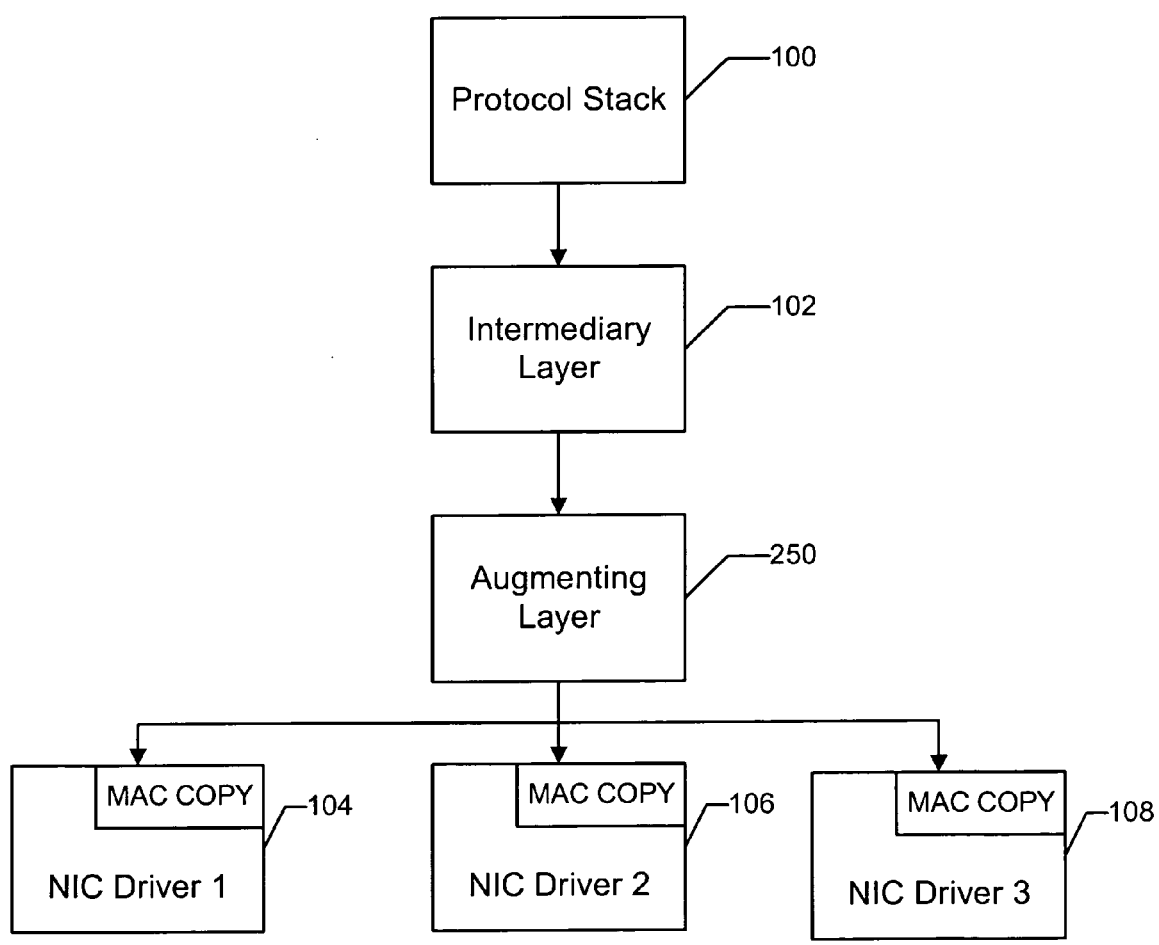
FIG. 3 illustrates the logical structure of a FIG. 2 embodiment.

FIG. 2 illustrates a low-level view of one embodiment for providing additional networking features not ordinarily supported by a network interface. FIG. 3 illustrates the logical structure of the FIG. 2 embodiment. In effect, FIG. 2 provides an "augmenting layer" 250 between a traditional intermediary layer 102 and its network interface drivers 104, 106, 108, providing opportunity to augment network interface drivers with functionality not originally planned for network interfaces 116, 118, 120.

In one embodiment, an augmentation layer 250 is implemented by "surrounding" an Intermediary layer 102 with a virtual protocol stack 202 and a virtual NIC driver 204. However, it will be appreciated by those skilled in the art that other configurations may be used to achieve a similar augmentation layer effect. (Note that this figure is highly abstracted to show general structure, and not implementation details.) A protocol stack 100, such as one typically provided by an operating system vendor (or by a network interface vendor supporting the network interface), is bound to the intermediary layer 102 in a conventional manner. The intermediary layer 102 is bound to the virtual NIC driver 204 instead of drivers 104, 106, 108 as depicted in FIG. 1. From the perspective of protocol stack 100, the protocol stack is bound to a valid network interface.

The virtual driver 204 routes networking requests to the virtual protocol stack 202 which then repackages the network traffic for the different NIC drivers 104, 106, 108. It will be appreciated that in accord with typical networking practices, return data will follow an inverse data path, allowing decryption of encrypted return data before the decrypted payload is given to the protocol stack 100. However, before routing the networking traffic to NIC drivers 104, 106, 108, the virtual driver 204, the driver may make use of original driver capabilities (e.g., ability to ask a network interface to encrypt data) by way of communication links 206, 208, 210.

Assume, for example, that NIC 1 116 has an on-board encryption ASIC, but NIC 2 118 and NIC 3 120 do not. As will be discussed in more detail below, in such a circumstance, encryption for NIC 2 118 and NIC 3 120 can be supported by routing encryption requests through NIC 1 116 encryption hardware and then repackaging the resultant encrypted data for delivery to NIC 2 118 and/or NIC 3 120 by way of the virtual protocol stack 202. That is, in one embodiment, network traffic to be encrypted would go from protocol stack 100, to the intermediary 102, to the virtual driver 204, which communicates with the NIC 1 driver 104 to have NIC 1 116 perform the encryption. The encrypted data is received by the virtual driver 204, given to the virtual protocol stack 202, which then re-sends the data for transmission by NIC 2 118 or NIC 3 120.

Figure 4:
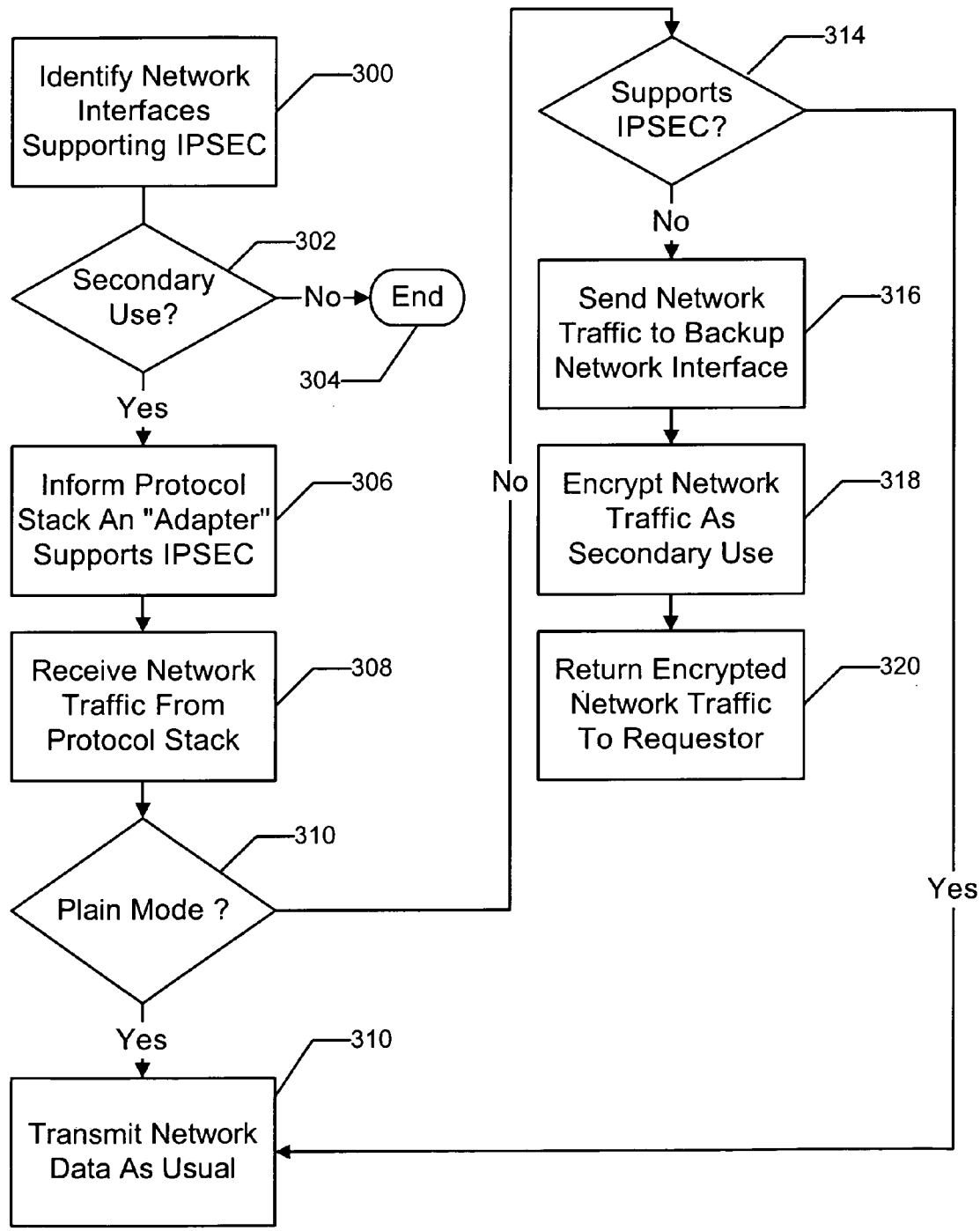
FIG. 4 is a flowchart for using a non-homogeneous team of network adapters as a homogenous team supporting a desired protocol or functionality.

FIG. 4, is a flowchart illustrating using network interfaces to provide missing features, e.g., encryption, for other network interfaces, so as to provide a team of network interfaces apparently capable of homogeneously performing a function even though some of the network interfaces in fact cannot perform the function.

Assume the team is performing adapter fault tolerance (AFT) or adaptive load balancing (ALB), such as provided by the Intel Advanced Networking Services (iANS), and that the team is to be presented as capable of homogeneously providing IPSEC encryption support even though one or more members of the team does not have encryption support.

The phrase "Adapter Fault Tolerance" means presenting, to protocol stacks, several network interfaces (working as a team) as one network interface. One of these network interfaces acts as an active, or primary, network interface for network communication. When a fault in one of the underlying network interfaces of the team is detected, iANS switches the faulty member network interface with another member network interface known to be functional. Using AFT, network communication will be resilient to failure in the member network interface in use when fail-over to another functional member network interface occurs.

The phrase "Adaptive Load Balancing" means presenting, to protocol stacks, several network interfaces (working as a team) as one network interface, using all of the network interfaces as an active network interface for network communication. Outband network traffic (transmit) is balanced between all team members comprising a fat channel capable to deliver high bandwidth. When a fault in one of the underlying network interfaces of the team is detected, iANS does not use the adapter, providing opportunity to replace the interface.

Note that IPSEC, AFT, and ALB are presented for exemplary purposes only, and that other encryption standards and networking capabilities are also intended to be supported as discussed herein.

In one embodiment, at least one of the network interfaces is based on an Intel 82559 or similar chipset providing IPSEC encryption support for a primary and a secondary use of the adapter. Primary use corresponds to use of a network interface to transmit and receive its own network traffic. Secondary use corresponds to use of a network interface to process data for an external entity, e.g., driver software for a different network interface, operating system component, API, or the like.

In secondary use, a network interface receives data from a requester to be encrypted or decrypted. In one embodiment, the received data is processed and returned to the requestor. In another embodiment, the processing adapter processes and then directly transmits the data to the network for the requester. For example, timing, throughput, or other considerations, may make direct transmission more efficient than returning the data for subsequent transmission. In one embodiment, the processing adapter is instructed to temporarily change its MAC address to the MAC address of the requestor's network interface lacking encryption support, so that responses to the transmitted network data will be received by the requestor's networking interface. Accordingly, network interfaces without IPSEC support may nonetheless process IPSEC network traffic by having the encryption processing handled by an IPSEC capable device.

The data to be secondarily processed can be stored in a host memory, such as in a main memory for a computing device housing the network interface, copied to a memory of the network interface, or stored in some other memory and made available to the network interface. It is assumed that Direct Memory Access, private or public bus, or some other communication pathway is available for receiving and returning data. Secondary use is intended to replace software encryption functions and consequently offload work from a host processor. When network interfaces having encryption support are present within a computing device, software encryption libraries can forward encryption tasks to the interfaces to be secondarily processed by the encryption hardware, interleaved with regular network traffic that goes out to the network.

Thus, to augment adaptive load balancing, adapter fault tolerance, or other networking functionality, a first operation is to identify 300 network interfaces bound to the augmentation layer 250 support IPSEC (or other functionality) to be shared. In one embodiment, the identification 300 operation confirms network interface identity data, such as vendor information and/or revision version of the network interface, to ensure compatibility with the augmentation layer. In a further embodiment, the augmentation layer refuses to operate with network interfaces not having particular identity data. For example, in such configurations, the augmentation layer may choose to only operate with network interfaces provided by the developer of the augmentation layer software and/or drivers.

A second operation is to verify 302 that at least one IPSEC capable interfaces provides secondary-use access to its encryption hardware. A single, fast, encryption component to an adapter may support encryption requirements for many other hardware devices. Alternatively, as discussed for FIG. 5, if multiple encryption-capable adapters are present, then all adapters can share task processing, e.g., operating as parallel processors.

If verification fails, then an adapter team cannot be heterogeneously shared, and sharing terminates 304. If verification succeeds, then the augmentation layer presents 306 itself to a protocol stack (e.g., protocol stack 100) as a network interface supporting IPSEC (or other desired functionality) with support for secondary use of its encryption hardware. Additionally, the augmentation layer may announce itself to an operating system as supporting secondary-use encryption tasks, thus allowing operating system APIs (e.g., Microsoft Windows CryptoAPI) to utilize encryption capabilities of the network interfaces.

The protocol stack then delivers 308 packets for transmission to the network 122 in either plain mode or encrypt mode. If 310 plain packets are to be sent, then the packets can be presented to an appropriate network interface's driver for transmission 312 in a customary manner. (Or they can be routed through the augmentation layer without any augmentation.)

However, if the packets are to be encrypted, then for each adapter that is to receive data for transmission, a check 314 is made to determine whether the adapter supports IPSEC transmissions. Note that depending on how one tracks which adapters can perform IPSEC transmissions, this check may or may not be literally performed. For example, a transmission mask may be employed to control which adapters simply send traffic without further review. It will be appreciated that which adapters receive data depends on transmission mode; thus, for example, under load balancing, all adapters receive a distributed portion of network traffic for transmission.

If the destination adapter does not support IPSEC, then the data payload for the destination adapter is sent 316 to a backup adapter that does support IPSEC. The backup adapter receives the data payload, encrypts 318 it pursuant to IPSEC, and returns 320 the encrypted data for delivery by the destination adapter as regular data. This arrangement allows load balancing (or other teaming algorithms) of IPSEC or other network traffic across a non-heterogeneous adapter team.

Figure 5:
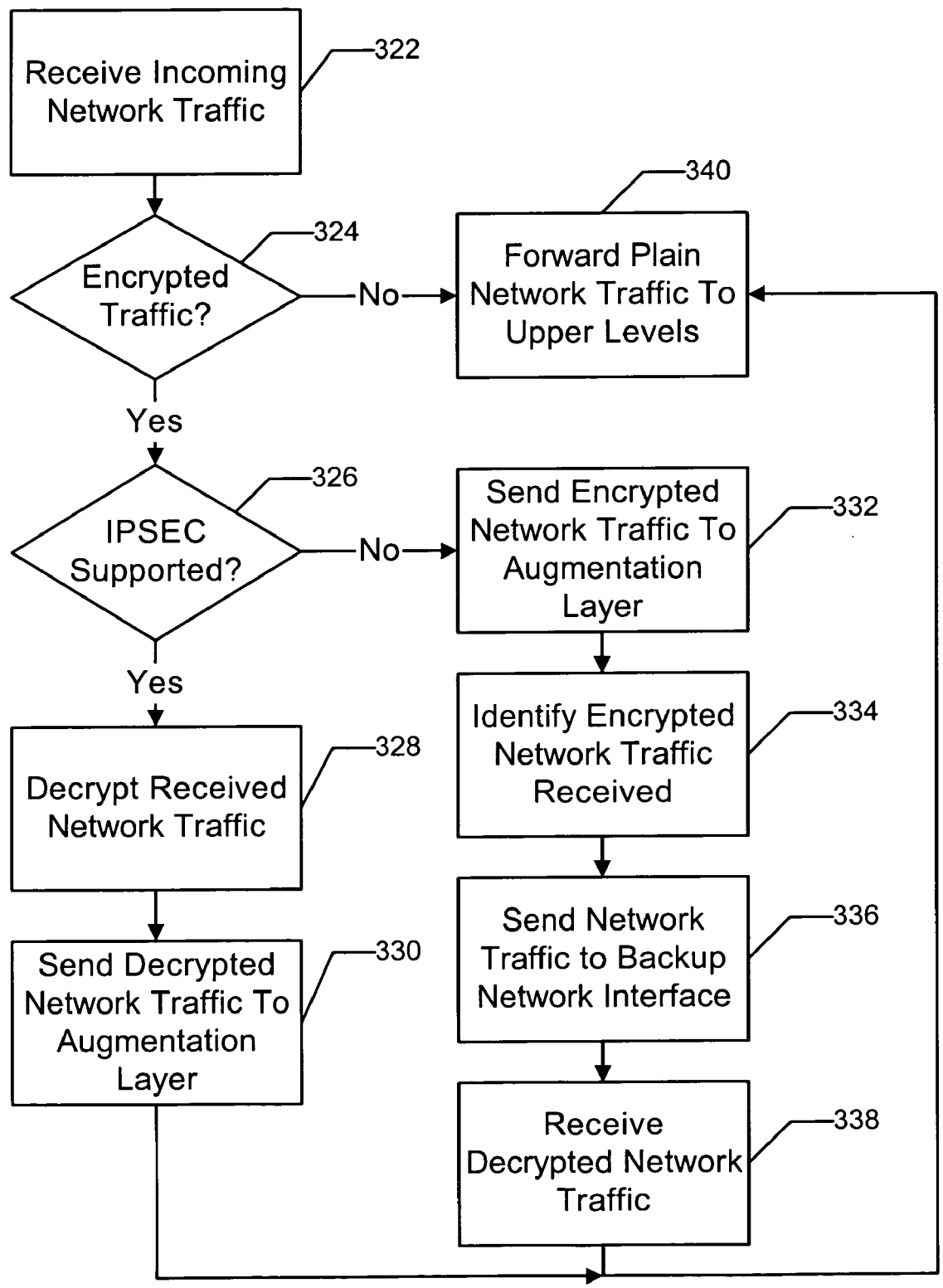
FIG. 5 is a flowchart illustrating one embodiment for processing receipt of network traffic sent according to FIG. 4.

FIG. 5 is a flowchart illustrating one embodiment for processing receipt of network traffic sent according to FIG. 4. Generally, on receipt 322 of incoming network traffic, an inverse to FIG. 4 series of operations is performed. For example, assuming a networking mode of transmitting load balanced IPSEC traffic, if 324 an encrypted packet is received from a network, and if 326 received by a network interface which is IPSEC capable, then the received traffic will automatically be decrypted 328 by the adapter and presented 330 to the augmentation layer as a plain text packet. However, if the adapter is not IPSEC capable, then encrypted packets received by the adapter will be presented 332 to the augmentation layer still in encrypted form as received from the network.

The augmentation layer identifies 334 the encrypted packets as being encrypted, and forwards 336 them for decryption (e.g., as a secondary task) by an available IPSEC-capable adapter. Decrypted packets are received 338 and forwarded 340 by the augmentation layer in accord with a current processing algorithm, e.g., traditional (direct), fault tolerant, load balancing, etc., for presentment as regular plain text packets for processing by upper layer protocol stacks.

Figure 6:
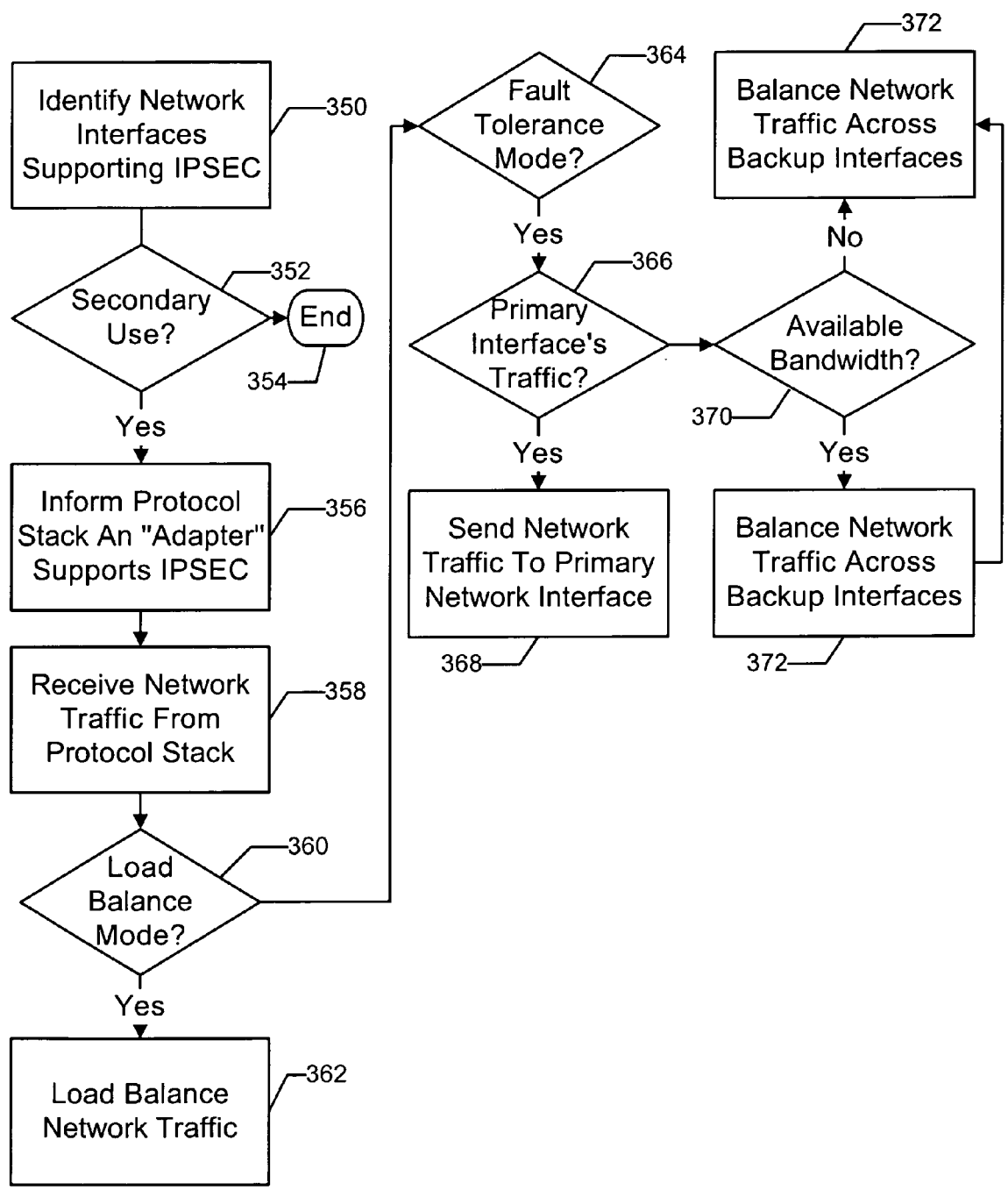
FIG. 6 illustrates one embodiment of using a team of network interfaces to boost secondary use encryption by distributing an encryption task across multiple team members.

FIG. 6 illustrates an algorithm for using a team of network interfaces, controlled by an augmentation layer 250, to boost secondary use encryption by distributing an encryption task across multiple team members; in one embodiment, the proportional distribution of the task is according to a current workload of each network interface of the team.

Secondary use encryption throughput is therefore scaled according to the number of members in the team and their availability. Secondary use in adaptive load balancing mode can be performed by distributing encryption tasks to team members according to their current workload. Secondary use in adapter fault tolerance mode favors distributing encryption tasks to network interface team members which are inactive and waiting on failure of a primary running network interface. Such idle network interfaces can be used as dedicated encryption devices.

Note that spreading processing of encryption using load balancing techniques is not limited only to using network interfaces as hardware accelerators, but also to using other hardware devices which are capable of performing encryption, such as other encryption-capable devices within a computing device hosting the network interfaces. Additionally, note that load balancing and fault tolerance are used as exemplary operations that respectively utilize all network interfaces, or a single interface of a team. It is contemplated that the present invention will be applied to other tasks.

Operations 350–358 correspond to operations 300–308 of FIG. 4, and are only briefly discussed for FIG. 5. Thus, a first operation is to identify 350 network interfaces bound to the augmentation layer 250 support IPSEC (or other functionality) to be shared, and a second operation is to verify 352 that multiple IPSEC capable interfaces provides secondary-use access to its encryption hardware. If verification fails, then encryption processing cannot be spread across the identified adapters, and spreading terminates 354. If verification succeeds, then the augmentation layer presents 356 itself to a protocol stack as a network interface supporting IPSEC with support for secondary use of its encryption hardware, and may announce itself to an operating system.

The protocol stack then delivers 358 packets for transmission to the network 122 in either plain mode, encrypt mode, or for secondary processing with loop back to a requestor (e.g., a protocol stack, encryption library or service, operating system, etc.). If 360 a network interface team is operating in adaptive load balance mode, the augmentation layer load balances 362 network traffic according to the network interface team's mode of operation.

If 364 a network interface team is operating in adapter fault tolerance mode, and if 366 regular network traffic, plain or encrypted is to be delivered to the primary (e.g., active) network interface, then the packets are delivered 368 to the primary adapter and transmitted to the network in a customary fashion.

If, however, non-regular traffic is received, e.g., secondary use data packets, then these packets are delivered to the backup network interface members such that they are balanced 372 across all available unused team members. If 370 the primary network interface has available resources, however, to process encryption tasks, then the primary adapter interleaves 374 secondary task processing with its primary transmission and receipt of network traffic. Remaining task processing is balanced 372 across all available unused team members. It is expected that appropriate queuing strategies will be employed to keep all adapters busy.

On receipt of network traffic, if the network interface team is operating in adaptive load balancing mode, or some other mode utilizing all network interfaces in the team, then if regular network traffic (plain or encrypted) is received, then it will be balanced across all team members as normal. If non-regular traffic is received, e.g., secondary use data packets, these packets are delivered to the all members of the network interface team such that they are balanced across all available team members.

Note that since encryption duties are separate from network transmission and reception, even if a network interface is defective or otherwise unable to process network transmissions, the network interface may still be functionally available for processing secondary use data. In one embodiment, when there are network interfaces that are not processing (or can not process) regular network traffic, these adapters will be first loaded with secondary use tasks to leave fully functional network interfaces available for processing regular network traffic. In addition, although not shown in these figures, processing accounts for the hot-swap removal and replacement of network interfaces. For example, if a defective network interface is replaced with a fully functional one, then the replacement interface should no longer receive a disproportionate amount of secondary use processing requests.

Figure 7:
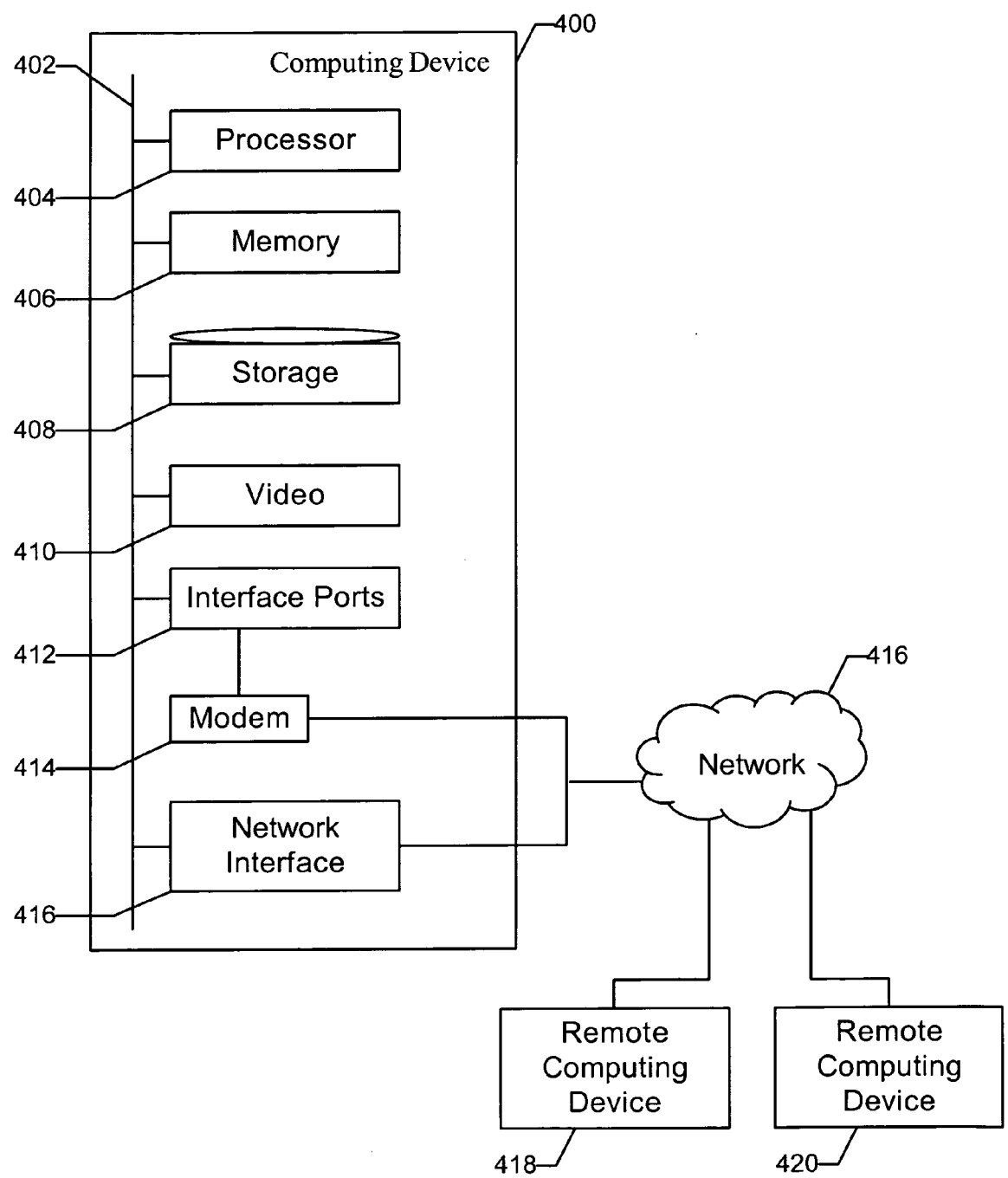
FIG. 7 illustrates a suitable computing environment in which certain aspects the claimed invention may be practiced.

FIG. 7 and the following discussion are intended to provide a brief, general description of a suitable computing environment in which portions of the invention may be implemented. An exemplary system for implementing the invention includes a computing device 400 having system bus 402 for coupling together various components within the computing device. The system bus may be any of several types of bus structures, such as PCI, AGP, VESA, etc. Typically, attached to the bus 402 are processors 404 such as Intel Pentium® processors, programmable gate arrays, etc., a memory 406 (e.g., RAM, ROM, NVRAM), computing-device readable storage-media 408, a video interface 410, input/output interface ports 412, and a network interface. A modem 414 may provide an input and/or output data pathway, such as for user input/output, and may operate as a network interface in lieu of or in conjunction with other network interfaces 416.

The computing-device readable storage-media 408 includes all computing device readable media, and can provide storage of programs, data, and other instructions for the computing device 400 and components communicatively coupled thereto (e.g., a network interface card attached to the system bus 402). Media 408 includes hard-drives, floppy-disks, optical storage, magnetic cassettes, tapes, flash memory cards, memory sticks, digital video disks, and the like.

The exemplary computing device 400 can store and execute a number of program modules within the memory 406, and computing-device readable storage-media 408. The executable instructions may be presented in terms of algorithms and/or symbolic representations of operations on data bits within a computer memory, as such representation is commonly used by those skilled in data processing arts to most effectively convey the substance of their work to others skilled in the art. Here, and generally, an algorithm is conceived to be a self-consistent sequence of steps leading to a desired result. The steps are those requiring physical manipulations of physical quantities, and can take the form of electrical or magnetic signals capable of being stored, transferred, combined, compared, and otherwise manipulated. Appropriate physical quantities of these signals are commonly referred to as bits, values, elements, symbols, characters, terms, numbers, or the like.

The invention may therefore be described by reference to different high-level program constructs and/or low-level hardware contexts, and may be part of single or multiprocessing host computing devices, such as personal computers, workstations, servers, etc., as well as hand-held devices and controllable consumer devices such as Personal Digital Assistants (PDAs), cellular telephones, or Internet television adapters. It will be appreciated that the invention can have its own processors, such as the Intel 82559 chipset providing IPSEC encryption support for network interfaces, and that these processors may operate asynchronously to, and possibly in conjunction with, host processors.

The computing device 400 is expected to operate in a networked environment 416 using logical connections to one or more remote computing devices 418, 420. In addition, the invention itself may operate in a distributed fashion across a network, where input and output, including user input and output (e.g., a graphical interface) may each occur at different networked locations. Thus, for example, assuming a perspective where computing device 400 utilizes a team of load balancing network interfaces, then remote computing devices 418, 420 include routers, a peer devices, a web server or other program utilizing networking protocols such as TCP/IP, IPSEC, IPX, hypertext transport protocol (HTTP), File Transfer Protocol (FTP), Gopher, Wide Area Information Server (WAIS), or the like.

It is understood that remote computing devices 418, 420 can be configured like computing device 400, and therefore may include many or all of the elements discussed for computing device 400. It should also be appreciated that computing devices 400, 418, 420 may be embodied as a single devices, or as a combination of separate devices; for example, a team of network interfaces may reside in a separate enclosure and be communicatively coupled to computing device 400 (e.g., by input/output interface ports 412 or other communication medium).

Having described and illustrated the principles of the invention with reference to illustrated embodiments, it will be recognized that the illustrated embodiments can be modified in arrangement and detail without departing from such principles. For example, while the foregoing description focused, for expository convenience, on using encryption hardware present in network interfaces to emulate encryption in non-capable network interfaces, and on distributing encryption tasks among multiple network interfaces, it will be recognized that the same techniques and analyses discussed above can be applied to other protocols and services. In particular, the encryption support need not reside in network interfaces, and instead may be provided by other components within a computing device.

And, even though the foregoing discussion has focused on particular embodiments, it is understood that other configurations are contemplated. In particular, even though the expressions "in one embodiment" or "in another embodiment" are used herein, these phrases are meant to generally reference embodiment possibilities, and are not intended to limit the invention to those particular embodiment configurations. These terms may reference the same or different embodiments, and unless indicated otherwise, are combinable into aggregate embodiments. Consequently, in view of the wide variety of permutations to the above-described embodiments, the detailed description is intended to be illustrative only, and should not be taken as limiting the scope of the invention. Rather, what is claimed as the invention, is all such modifications as may come within the scope and spirit of the following claims and equivalents thereto.

What is claimed is:

1. A method utilizing a team of heterogeneously sharing network interfaces providing primary and secondary use processing of data, comprising:
   receiving data for processing by said team;
   assigning processing of said received data to a first member of said team; and
   if processing of said data includes encryption processing, determining if the first member lacks a functionality required for encryption processing said data, and if so, distributing processing of said data to at least one second member of said team having the encryption processing functionality, for transparent processing by the at least one second member on behalf of the first member.

2. The method of claim 1, in which network interfaces have Media Access Control (MAC) addresses, the method further comprising:
   setting the MAC address for the second member of said team to the MAC address of the first member of said team.

3. The method of claim 1, in which network interfaces have Media Access Control (MAC) addresses, the method further comprising:
   temporarily setting the MAC address for the second member of said team to the MAC address of the first member of said team while the second member performs said transparent processing on behalf of the first member of said team.

4. The method of claim 1, wherein said distributing processing is according to a workload of each of said team of network interfaces supporting the capability.

5. The method of claim 1, wherein processing said data includes encrypting said data according to IPSEC.

6. The method of claim 1, further comprising:
   receiving data for secondary use processing from an operating system.

7. The method of claim 1, further comprising:
   receiving data for secondary use processing from an application programming interface configured to submit data for secondary use processing by said team.

8. An accessible medium having associated instructions for heterogeneously sharing a team of network interfaces providing primary and secondary use processing of data, said instructions, when accessed by a machine, directs the machine to:
   receive data for processing by said team;
   assign processing of said received data to a first member of said team; and
   if processing said data includes encryption processing, determine if the first member lacks a functionality required for encryption processing said data, and if so, distribute processing of said data to at least one second member of said team having encryption processing functionality, for transparent processing by the at least one second member on behalf of the first member.

9. The medium of claim 8, in which network interfaces have Media Access Control (MAC) addresses, and said instructions including further instructions to direct the processor to:
   set the MAC address for the second member of said team to the MAC address of the first member of said team.

10. The medium of claim 8, in which network interfaces have Media Access Control (MAC) addresses, and said instructions including further instructions to direct the processor to:
    temporarily set the MAC address for the second member of said team to the MAC address of the first member of said team while the second member performs said transparent processing on behalf of the first member of said team.

11. The medium of claim 8, said instructions including further instructions to direct the processor to:
    distribute processing of said data according to a workload of each of said team of network interfaces supporting the capability.

12. The medium of claim 8, said instructions including further instructions to:
    direct the processor to encrypt said data according to IPSEC.

13. The medium of claim 8, said instructions including further instructions to:
    direct the processor to receive data for secondary use processing from an operating system.

14. The medium of claim 8, said instructions including further instructions to direct the processor to:
    receive data for secondary use processing from an application programming interface configured to submit data for secondary use processing by said team.

15. A method for utilizing a team of network interfaces operating in adaptive load balancing mode to provide primary and secondary use processing of data, comprising:
    identifying active and failed network interfaces of said team;
    receiving data for processing and transmission by said team;
    if said data is primary use processing, then distributing processing of said data across said active network interfaces of said team; and if processing said data includes encryption processing, then distributing processing of said data across all active and failed network interfaces of said team, wherein if a first network interface of said team lacks a functionality required to encrypt said data, then transparently routing said data to a second network interface of said team supporting the encryption processing functionality.

16. The method of claim 15, further comprising:

loading a driver for said team, said driver configuring said team to operate in the adaptive load balancing mode and appear to be a single network interface.

17. The method of claim 15, further comprising:

receiving, by a first one of said team of network interfaces, a portion of said received data for processing; and identifying the capability is required for processing said portion.

18. The method of claim 15, further comprising:

installing said team of network interfaces in a computing device having an operating system; and receiving data for secondary use processing from said operating system.

19. The method of claim 18, wherein an application programming interface is configured to submit data for secondary use processing by said team.

20. The method of claim 15, further comprising:

installing said team of network interfaces in a computing device having an operating system; and receiving data for secondary use processing from an application programming interface configured to submit data for secondary use processing by said team.

21. An accessible medium having associated instructions for utilizing a team of network interfaces operating in adaptive load balancing mode to provide primary and secondary use processing of data, said instructions, when accessed by a machine, directs the machine to:

identify active and failed network interfaces of said team;

receive data for processing and transmission by said team;

determine if said data is primary use processing, and if so, then distribute processing of said data across said active network interfaces of said team; and determine if processing said data includes encryption processing, and if so, then distribute processing of said data across all active and failed network interfaces of said team, wherein if a first network interface of said team lacks a functionality required to process said data, then routing said data to a second network interface of said team supporting the encryption processing functionality.

22. The medium of claim 21, said instructions including further instructions to direct the processor to:

load a driver for said team, said driver configuring said team to operate in the adaptive load balancing mode and appear to be a single network interface.

23. The medium of claim 21, said instructions including further instructions to direct the processor to:

receive a portion of said received data for processing by a first one of said team of network interfaces;

identify the capability is required for processing said portion.

24. The medium of claim 21, said instructions including further instructions to direct the processor to:

receive data for secondary use processing from an operating system.

25. The medium of claim 21, said instructions including further instructions to direct the processor to:

receive data for secondary use processing from an application programming interface configured to submit data for secondary use processing by said team.

* * * * *